(12) United States Patent
Lee et al.

(10) Patent No.: US 10,208,199 B2
(45) Date of Patent: Feb. 19, 2019

(54) POLYESTER RESIN COMPOSITION AND MOLDED ARTICLE PRODUCED USING THE SAME

(71) Applicant: LOTTE ADVANCED MATERIALS CO., LTD., Yeosu-si (KR)

(72) Inventors: Bong Jae Lee, Uiwang-si (KR); Yang Il Kim, Uiwang-si (KR); Min Soo Lee, Uiwang-si (KR); Seon Hui Lee, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 15/272,586

(22) Filed: Sep. 22, 2016

(65) Prior Publication Data

US 2017/0088707 A1   Mar. 30, 2017

(30) Foreign Application Priority Data

Sep. 24, 2015   (KR) .......................... 10-2015-0135931

(51) Int. Cl.
*C08L 67/00* (2006.01)
*C08L 67/02* (2006.01)

(52) U.S. Cl.
CPC ......... *C08L 67/02* (2013.01); *C08L 2205/025* (2013.01); *C08L 2666/54* (2013.01)

(58) Field of Classification Search
None
See application file for complete search history.

(56) References Cited

U.S. PATENT DOCUMENTS

2012/0183778 A1*  7/2012  Farrell .................... C08L 67/02
                                                   428/412

FOREIGN PATENT DOCUMENTS

| CN | 101910305 A | 12/2010 |
| CN | 103314053 A | 9/2013 |
| KR | 10-2002-0062403 A | 7/2002 |
| KR | 10-2015-0066384 A | 6/2015 |
| KR | 10-2015-0094144 A | 8/2015 |

OTHER PUBLICATIONS

Office Action in counterpart Chinese Application No. 201610847746.5 dated Jul. 16, 2018, pp. 1-7.
English-translation of Office Action in counterpart Chinese Application No. 201610847746.5 dated Jul. 16, 2018, pp. 1-7.

* cited by examiner

*Primary Examiner* — Ana L. Woodward
(74) *Attorney, Agent, or Firm* — Additon, Higgins & Pendleton, P.A.

(57) ABSTRACT

A polyester resin composition and a molded article produced using the same. The polyester resin composition includes: a crystalline polyester resin; a non-crystalline polyester resin; and glass fibers, wherein a weight ratio of the crystalline polyester resin to the non-crystalline polyester resin ranges from about 4:1 to about 1:1.

10 Claims, No Drawings

POLYESTER RESIN COMPOSITION AND MOLDED ARTICLE PRODUCED USING THE SAME

CROSS-REFERENCE TO RELATED APPLICATION

This application claims priority under 35 USC Section 119 to and the benefit of Korean Patent Application No. 10-2015-0135931, filed on Sep. 24, 2015 in the Korean Intellectual Property Office, the entire disclosure of which is incorporated herein by reference.

FIELD

The present invention relates to a polyester resin composition and a molded article produced using the same.

BACKGROUND

A thermoplastic resin has a lower specific gravity than glass or metal, has excellent properties in terms of moldability and impact resistance, and is thus useful as materials for a housing of electric/electronic products, automotive interior/exterior materials, and exterior materials for construction. Particularly, with the trend of reducing weight and thickness of electric/electronic products, plastic products using such a thermoplastic resin are rapidly replacing glass or metal products.

For example, a polyester resin such as polyethylene terephthalate (PET) has excellent properties in terms of weather resistance, impact resistance, chemical resistance, and gloss and is widely used in various fields.

However, polyethylene terephthalate is hydrolyzed at high temperature, has low glass transition temperature, and is thus unsuitable for use in components requiring high heat resistance, such as electric/electronic products or automotive interior/exterior materials.

In order to overcome these problems, there has been proposed a method in which fillers such as glass fibers or crystalline polyester resins such as polybutylene terephthalate are added to improve heat resistance of a polyester resin. However, a polyester resin prepared by this method can have low flowability and thus poor moldability. Although reducing the amount (content) of glass fibers or reducing molecular weight of a crystalline polyester resin can improve flowability of a polyester resin, these methods can reduce impact resistance of the polyester resin, causing the resin to be vulnerable to external impact. Therefore, there is a need for a polyester resin composition which exhibits excellent properties in terms of both flowability and impact resistance.

SUMMARY OF THE INVENTION

Exemplary embodiments provide a polyester resin composition which can exhibit excellent properties in terms of flowability and impact resistance.

Exemplary embodiments provide a molded article produced using the polyester resin composition.

In accordance with exemplary embodiments of the present invention, a polyester resin composition includes: a crystalline polyester resin; a non-crystalline polyester resin; and glass fibers, wherein a weight ratio of the crystalline polyester resin to the non-crystalline polyester resin ranges from about 4:1 to about 1:1.

The crystalline polyester resin may have a melting point of about 200° C. to about 270° C. and may be, for example, a polybutylene terephthalate resin.

The non-crystalline polyester resin may be a polymer of a dicarboxylic acid component and a diol component and may have a glass transition temperature of about 40° C. to about 120° C. In exemplary embodiment, the dicarboxylic acid component may include about 4 wt % or more of isophthalic acid. In addition, the diol component may include about 5 wt % to about 60 wt % of cyclohexane dimethanol. Further, the diol component may include about 40 wt % to about 95 wt % of ethylene glycol.

The glass fibers may be present in an amount of about 10 wt % to about 50 wt % in the polyester resin composition.

The polyester resin composition may include: about 25 wt % to about 80 wt % of the crystalline polyester resin; about 5 wt % to about 45 wt % of the non-crystalline polyester resin; and about 10 wt % to about 50 wt % of the glass fibers.

The polyester resin composition may further include an additive selected from the group consisting of UV absorbers, inorganic additives, flame retardants, lubricants, plasticizers, heat stabilizers, antioxidants, photostabilizers, pigments, dyes, and mixtures thereof.

The polyester resin composition may have an impact resistance of about 40 cm or higher, as measured on a specimen having a size of 10 cm×10 cm×1.0 mm using a 500 g dart in accordance with the DuPont drop test after the specimen is subjected to aging at 25° C./80% relative humidity (RH) for 24 hours.

The polyester resin composition may have a melt flow index of about 5 g/10 min to about 50 g/10 min, as measured at 280° C. under a load of 2.16 kg in accordance with ISO 1133.

Other embodiments of the present invention provide a molded article produced using the polyester resin composition as set forth above.

DETAILED DESCRIPTION

The above and other embodiments, features, and advantages of the present invention will become apparent from the detailed description of the following embodiments. It should be understood that the present invention is not limited to the following embodiments and may be embodied in different ways, and that the embodiments are provided for complete disclosure and thorough understanding of the present invention by those skilled in the art. The scope of the present invention should be defined only by the appended claims.

A polyester resin composition includes: (A) a crystalline polyester resin; (B) a non-crystalline polyester resin; and (C) glass fibers, wherein a weight ratio of the (A) crystalline polyester resin to the (B) non-crystalline polyester resin ranges from 4:1 to about 1:1. For example, a weight ratio of the (A) crystalline polyester resin to the (B) non-crystalline polyester resin can range from about 4:1 to about 1.5:1, and as another example about 4:1 to about 2:1.

Generally, in a polyester resin composition, there is known to be a compromise between flowability and impact strength. However, the present inventors have found that, when an amount ratio of crystalline polyester to non-crystalline polyester is within a particular range, that is, a weight ratio of crystalline polyester to non-crystalline polyester ranges from about 4:1 to about 1:1, the polyester resin composition can exhibit excellent properties in terms of both flowability and impact resistance.

Next, each component of the polyester resin composition according to the present invention will be described in detail.

(A) Crystalline Polyester Resin

The crystalline polyester resin is a polymer obtained by polycondensation of a diol compound and terephthalic acid or dimethyl terephthalate through direct esterification or transesterification and has a crystalline structure therein.

Examples of the diol compound may include without limitation ethylene glycol, 1,2-propylene glycol, 1,3-propylene glycol, 2,2-dimethyl-1,3-propanediol, 1,3-butanediol, 1,4-butanediol, 1,5-pentanediol, 1,6-hexanediol, 1,3-cyclohexane dimethanol, 1,4-cyclohexane dimethanol, and the like, and mixtures thereof.

Examples of the crystalline polyester resin may include without limitation polybutylene terephthalate, polyethylene terephthalate, polypropylene terephthalate, polytriethylene terephthalate, polyhexamethylene terephthalate, and the like, and mixtures thereof, for example polybutylene terephthalate.

The polybutylene terephthalate may be prepared by polycondensation of 1,4-butanediol and terephthalic acid or dimethyl terephthalate through direct esterification or transesterification.

Optionally, isophthalic acid and/or dimethyl isophthalate may be included along with the terephthalic acid and/or dimethyl terephthalate. The isophthalic acid and/or the dimethyl isophthalate may be present in an amount of less than 4 wt %, for example, greater than 0 wt % (when present) to less than 2 wt %, based on the total weight (100 wt %) of a dicarboxylic acid component of the crystalline polyester resin.

The crystalline polyester resin may have a melting point of about 200° C. to about 270° C., for example about 200° C. to about 250° C., and as another example 210° C. to 240° C. Within this range, the resin composition can secure sufficient flowability and exhibit excellent impact resistance after molding.

The polyester resin composition can include the crystalline polyester resin in an amount of about 25 wt % to about 80 wt %, for example about 30 wt % to about 60 wt %, and as another example about 35 wt % to about 55 wt %, based on the total weight (100 wt %) of the polyester resin composition. In some embodiments, the polyester resin composition can include the crystalline polyester resin in an amount of about 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %. Further, according to some embodiments, the amount of the crystalline polyester resin can be in a range from about any of the foregoing amounts to about any other of the foregoing amounts.

Within this range, the resin composition can exhibit excellent balance between flowability, impact resistance, heat resistance, and mechanical properties.

(B) Non-Crystalline Polyester Resin

The non-crystalline polyester resin is a polymer of a dicarboxylic acid component and a diol component and does not have a crystalline structure therein. Specifically, the non-crystalline polyester resin is a modified polyester resin in which the dicarboxylic acid component and/or the diol component are partially modified.

For example, the non-crystalline polyester resin may be a modified polyester resin prepared by polycondensation of a diol component and a dicarboxylic acid component including about 4 wt % or more of isophthalic acid based on the total weight (100 wt %) of the dicarboxylic acid component through esterification or transesterification.

In exemplary embodiments, the remainder of the dicarboxylic acid component excluding the isophthalic acid may be terephthalic acid. In other words, the dicarboxylic acid component may be a mixture of terephthalic acid and isophthalic acid.

The terephthalic acid may be present in an amount of about 96 wt % or less, for example about 50 wt % to 90 wt %, based on the total weight (100 wt %) of the dicarboxylic acid component. The isophthalic acid may be present in an amount of about 4 wt % or more, for example about 10 wt % to 50 wt %, based on the total weight (100 wt %) of the dicarboxylic acid component.

In some embodiments, the dicarboxylic acid component can include terephthalic acid in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, or 96 wt %. Further, according to some embodiments, the amount of the terephthalic acid can be in a range from about any of the foregoing amounts to about any other of the foregoing amounts.

In some embodiments, the dicarboxylic acid component can include isophthalic acid in an amount of about 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the isophthalic acid can be in a range from about any of the foregoing amounts to about any other of the foregoing amounts.

Examples of diols of the diol component may include without limitation ethylene glycol, cyclohexane dimethanol, 1,2-propylene glycol, 1,3-propylene glycol, 2,2-dimethyl-1,3-propanediol, 1,3-butanediol, 1,4-butanediol, 1,5-pentanediol, 1,6-hexanediol, 1,3-cyclohexane dimethanol, 1,4-cyclohexane dimethanol, and the like, and mixtures thereof.

Alternatively, the non-crystalline polyester resin may be a modified polyester resin prepared by polycondensation of a dicarboxylic acid component and a diol component including about 5 wt % to about 60 wt % of cyclohexane dimethanol based on the total weight (100 wt %) of the diol component through esterification or transesterification.

In this embodiment, the diol component can include cyclohexane dimethanol in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the cyclohexane dimethanol can be in a range from about any of the foregoing amounts to about any other of the foregoing amounts.

Also in this embodiment, the remainder of the diol component excluding the cyclohexane dimethanol may include without limitation ethylene glycol, 1,2-propylene glycol, 1,3-propylene glycol, 2,2-dimethyl-1,3-propanediol, 1,3-butanediol, 1,4-butanediol, 1,5-pentanediol, 1,6-hexanediol, 1,3-cyclohexane dimethanol, and/or 1,4-cyclohexane dimethanol, without being limited thereto. In exemplary embodiments, ethylene glycol can be used.

For example, the diol component may be a mixture of cyclohexane dimethanol and ethylene glycol. In exemplary embodiments, the diol component can include cyclohexane dimethanol in an amount of about 5 wt % to about 60 wt %, for example about 10 wt % to about 50 wt %, based on the total weight (100 wt %) of the diol component. In some embodiments, the diol component can include cyclohexane dimethanol in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 wt %. Further, according to some embodiments, the amount of the cyclohexane dimethanol can be in a range from about any of the foregoing amounts to about any other of the foregoing amounts.

Also in exemplary embodiments, the diol component can include ethylene glycol in an amount of about 40 wt % to about 95 wt %, for example about 50 wt % to about 90 wt %, based on the total weight (100 wt %) of the diol component. In some embodiments, the diol component can include ethylene glycol in an amount of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 wt %. Further, according to some embodiments, the amount of the ethylene glycol can be in a range from about any of the foregoing amounts to about any other of the foregoing amounts.

Examples of the dicarboxylic acid and/or dialkyl ester thereof of the dicarboxylic acid component may include without limitation terephthalic acid (TPA), isophthalic acid (IPA), polycyclic aromatic dicarboxylic acids such as 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid, and aromatic dicarboxylates such as dimethyl terephthalate (DMT), dimethyl isophthalate, dimethyl-1,2-naphthalate, dimethyl-1,5-naphthalate, dimethyl-1,7-naphthalate, dimethyl-1,8-naphthalate, dimethyl-2,3-naphthalate, dimethyl-2,6-naphthalate, and dimethyl-2,7-naphthalate, and the like. These dicarboxylic acid components may be used alone or as a mixture thereof. For example, terephthalic acid, isophthalic acid, or a combination thereof can be used as the dicarboxylic acid component.

The non-crystalline polyester resin may have a glass transition temperature of about 40° C. to about 120° C., for example about 50° C. to 100° C. Within this range, the resin composition can secure sufficient flowability and exhibit excellent impact resistance after molding.

The polyester resin composition can include the non-crystalline polyester resin in an amount of about 5 wt % to about 45 wt %, for example about 8 wt % to about 40 wt %, and as another example about 10 wt % to about 35 wt %, based on the total weight (100 wt %) of the polyester resin composition. In some embodiments, the polyester resin composition can include the non-crystalline polyester resin in an amount of about 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, or 45 wt %. Further, according to some embodiments, the amount of the non-crystalline polyester resin can be in a range from about any of the foregoing amounts to about any other of the foregoing amounts.

Within this range, the resin composition can exhibit excellent balance between flowability, impact resistance, heat resistance, and mechanical properties.

(C) Glass Fibers

The glass fibers are well known to those skilled in the art and may be commercially available products or may be prepared by a typical method known in the art.

Sectional shape of the glass fibers is not particularly limited, and the glass fibers may have various cross-sectional shapes including a circular cross-sectional shape depending on purposes thereof. It should be understood that the present invention is not limited to a particular kind of glass fibers. For example, the glass fibers may be glass fibers having a circular and/or rectangular cross-sectional shape. The glass fibers having a circular cross-sectional shape may have a cross-sectional diameter of about 5 μm to about 20 μm, and a length of about 2 mm to about 20 mm before processing. The glass fibers having a rectangular cross-sectional shape may have a cross-sectional aspect ratio of about 1.5 to about 10, and a length of about 2 mm to about 20 mm before processing.

The polyester resin composition can include the glass fibers in an amount of about 10 wt % to about 50 wt %, for example about 15 wt % to about 50 wt %, and as another example about 20 wt % to about 50 wt %, based on the total weight (100 wt %) of the polyester resin composition. In some embodiments, the polyester resin composition can include the glass fibers in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments, the amount of the glass fibers can be in a range from about any of the foregoing amounts to about any other of the foregoing amounts.

Within this range, the resin composition can exhibit excellent balance between stiffness, flexural strength, and impact resistance.

In addition to the above components, the polyester resin composition may further include one or more additives, as needed. Examples of the additives may include without limitation inorganic fillers other than glass fibers, flame retardants, flame retardant aids, release agents, lubricants, plasticizers, heat stabilizers, anti-dripping agents, nucleating agents, antioxidants, photostabilizers, pigments, dyes, and the like, and mixtures thereof.

Examples of the inorganic fillers may include without limitation carbon fibers, wollastonite, whiskers, basalt fibers, talc, mica, alumina, and the like, and mixtures thereof. The inorganic fillers can serve to further improve mechanical properties, heat deflection temperature, and the like.

Examples of the flame retardants can include without limitation red phosphorus, phosphate compounds, phosphonate compounds, phosphinate compounds, phosphine oxide compounds, phosphazene compounds, metal salts thereof, and the like, and mixtures thereof. Examples of the release agents can include without limitation polyethylene waxes, fluoride-containing polymers, silicone oils, metal salts of stearic acid, metal salts of montanic acid, montanic acid ester waxes, and the like, and mixtures thereof. Examples of the nucleating agents can include without limitation clay. Examples of the antioxidants can include without limitation hindered phenol compounds.

The polyester resin composition according to the present invention may be prepared by any suitable method known in the art. For example, the polyester resin composition may be prepared in pellet form by mixing the above components and optionally one or more additives, followed by melt extrusion in an extruder.

For example, the polyester resin composition can be prepared in pellet form by introducing the crystalline polyester resin and the non-crystalline polyester resin through a main feeder and introducing the glass fibers through a side feeder. Here, the temperature of the extruder may be set to about 220° C. to about 290° C.

The polyester resin composition according to the present invention can exhibit excellent properties in terms of flowability and impact resistance.

For example, the polyester resin composition may have an impact resistance of about 40 cm or higher, for example about 40 cm to about 90 cm, and as another example about 50 cm to about 90 cm, as measured on a specimen having a size of 10 cm×10 cm×1.0 mm using a 500 g dart in accordance with the DuPont drop test after the specimen is subjected to aging at 25° C./80% RH for 24 hours.

In addition, the polyester resin composition may have a melt flow index of about 5 g/10 min to about 50 g/10 min, for example about 8 g/10 min to about 40 g/10 min, and as another example about 10 g/10 min to about 35 g/10 min, as measured at 280° C. under a load of 2.16 kg in accordance with ISO 1133.

As described above, the polyester resin composition according to the present invention can have excellent flowability and thus good moldability, and can exhibit excellent impact strength after molding and thus can be used in various fields, for example, exterior materials for electronic products.

A molded article according to the present invention may be produced using the polyester resin composition as set forth above. The polyester resin composition may be formed into the molded article by a molding method known in the art, such as injection molding, double injection molding, blow molding, extrusion, and thermal molding.

Hereinafter, the present invention will be described in more detail with reference to the following examples.

EXAMPLES

Details of components used in the following Examples and Comparative Examples are as follows.

(A) Crystalline polyester resin (a1) Polybutylene terephthalate (Bluestar Chemical Industry Co., Ltd.) having a melting point of 225° C. is used (a2) Polybutylene terephthalate (Bluestar Chemical Industry Co., Ltd.) having a melting point of 223° C. is used (B) Non-crystalline polyester resin (b1) Polyethylene terephthalate glycol-modified (PETG) (SK Chemicals Co., Ltd.) having a glass transition temperature of 72° C. is used.

(b2) PETG (SK Chemicals Co., Ltd.) having a glass transition temperature of 86° C. is used.

(b3) Polycyclohexylenedimethylene terephthalate glycol-modified (PCTG) (Eastman Chemical) having a glass transition temperature of 92° C. is used.

(C) Glass fiber: Glass fibers (Nitto Boseki Co., Ltd.) having a length of 3 mm and a cross-sectional aspect ratio of 4 are used.

Examples and Comparative Examples

The above components are mixed in amounts as listed in Table 1 and subjected to dry blending, followed by extrusion at a nozzle temperature of 270° C. using a twin-screw extruder having a diameter of 45 mm, thereby preparing a polyester resin composition in pellet form. Here, the glass fibers and the components other than the glass fibers are introduced through a side feeder and a main feeder, respectively. The prepared pellets are dried at 100° C. for 3 hours or more, followed by injection molding using a 10 oz. injection molding machine at a molding temperature of 260° C. and a mold temperature of 100° C., thereby preparing a specimen for property evaluation.

The prepared specimen is evaluated as to the following properties, and results are shown in Table 1.

Property Evaluation (1) Impact resistance (unit: cm): A plate-type specimen having a size of 1 mm×10 cm×10 cm (thickness×length×width) is prepared by injection molding and subjected to aging in a thermo-hygrostat (at 25° C./80% RH). Impact resistance is measured on 20 or more specimens using a falling dart impact tester with a 500 g dart by dropping the dart on the specimens and measuring a height (in centimeters) of the dart at which 50% of the specimens are fractured (in accordance with the DuPont drop test).

(2) Flowability (unit: g/10 min): Melt flow index of each of the resin compositions is measured in accordance with ISO 1133. A pelletized resin composition is melted at 280° C. for 10 minutes, followed by application of a 2.16 kg weight and sampling an outflow of the resin composition for 10 seconds to measure the weight of the sample. The measured value is converted into an outflow amount for 10 minutes.

TABLE 1

|  |  | Example 1 | Example 2 | Example 3 | Example 4 | Example 5 | Comp. Example 1 | Comp. Example 2 | Comp. Example 3 | Comp. Example 4 |
|---|---|---|---|---|---|---|---|---|---|---|
| (A) (wt %) | (a1) | 40 | 40 | 40 | 45 | 30 | 60 | 40 | 50 | 20 |
|  | (a2) | — | — | — | — | — | — | 20 | — | — |
| (B) (wt %) | (b1) | 20 | — | — | 15 | 30 | — | — | 10 | 40 |
|  | (b2) | — | 20 | — | — | — | — | — | — | — |
|  | (b3) | — | — | 20 | — | — | — | — | — | — |
| (C) (wt %) |  | 40 | 40 | 40 | 40 | 40 | 40 | 40 | 40 | 40 |
| Impact resistance (cm) |  | 54.4 | 51.6 | 54.4 | 51.2 | 68.3 | 28.5 | 32.3 | 30.4 | 39.2 |
| Flowability (g/10 min) |  | 18.0 | 23.1 | 26.0 | 25.4 | 17.7 | 28.1 | 36.1 | 20.3 | 12.1 |

From the results shown in Table 1, it can be seen that the polyester resin compositions of Examples 1 to 5 including the crystalline polyester resin and the non-crystalline polyester resin in a weight ratio of 4:1 to 1:1 have excellent properties in terms of impact resistance and flowability, whereas the polyester resin compositions of Comparative Examples 1 to 4 have considerably poor impact resistance. In addition, the polyester resin compositions of Comparative Examples 3 and 4, in which a weight ratio of the crystalline polyester resin to the non-crystalline polyester resin is outside the range described herein have insignificant improvement in impact resistance. Particularly, it can be seen that the polyester resin composition of Comparative Example 4 has considerably poor flowability despite having insignificant improvement in impact resistance.

Therefore, the polyester resin according to the present invention can have excellent properties in terms of both flowability and impact resistance and thus can be used as a material for various electronic products, such as an exterior material for mobile phones.

Although some embodiments have been described above, it should be understood that these embodiments are provided for illustration only and are not to be construed in any way as limiting the present invention, and that various modifications, changes, and alterations can be made by those skilled in the art without departing from the spirit and scope of the invention. Therefore, the scope of the present invention should be defined by the appended claims and equivalents thereof.

What is claimed is:

1. A polyester resin composition consisting essentially of about 25 wt % to about 40% of a crystalline polyester resin; about 7 wt % to about 40 wt % of a non-crystalline polyester resin; and about 10 wt % to about 50 wt % of glass fibers, each based on 100 wt % of the polyester resin composition, and optionally an additive selected from the group consisting of UV absorbers, inorganic additives, lubricants, plasticizers, heat stabilizers, antioxidants, photostabilizers, pigments, dyes, and mixtures thereof,
wherein the weight ratio of the crystalline polyester resin to the non-crystalline polyester resin ranges from about 4:1 to 2:1,
wherein the polyester resin composition has an impact resistance of about 50 cm or higher, as measured on a specimen having a size of 10 cm×10 cm×1.0 mm using a 500 g dart in accordance with the DuPont drop test after the specimen is subjected to aging at 25° C./80% RH for 24 hours.

2. The polyester resin composition according to claim 1, wherein the crystalline polyester resin has a melting point of about 200° C. to about 270° C.

3. The polyester resin composition according to claim 1, wherein the crystalline polyester resin comprises a polybutylene terephthalate resin.

4. The polyester resin composition according to claim 1, wherein the non-crystalline polyester resin is a polymer of a dicarboxylic acid component and a diol component, and has a glass transition temperature of about 40° C. to about 120° C.

5. The polyester resin composition according to claim 4, wherein the dicarboxylic acid component comprises about 4 wt % or more of isophthalic acid.

6. The polyester resin composition according to claim 4, wherein the diol component comprises about 5 wt % to about 60 wt % of cyclohexane dimethanol.

7. The polyester resin composition according to claim 4, wherein the diol component comprises about 40 wt % to about 95 wt % of ethylene glycol.

8. The polyester resin composition according to claim 1, wherein the polyester resin composition has a melt flow index of about 5 g/10 min to about 50 g/10 min, as measured at 280° C. under a load of 2.16 kg in accordance with ISO 1133.

9. A molded article produced using the polyester resin composition according to claim 1.

10. The polyester resin composition according to claim 1, wherein the non-crystalline polyester resin is present in an amount of about 7 wt % to about 25 wt %.

* * * * *